(12) United States Patent
Kim et al.

(10) Patent No.: US 6,535,360 B1
(45) Date of Patent: Mar. 18, 2003

(54) DISK DRIVE HEAD SUSPENSION ASSEMBLY WITH MICROACTUATOR

(75) Inventors: Seok-jung Kim, Suwon (KR); Yong-hoon Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 72 days.

(21) Appl. No.: 09/580,459

(22) Filed: May 30, 2000

(30) Foreign Application Priority Data

Jun. 2, 1999 (KR) .............................................. 99-20180

(51) Int. Cl.[7] .............................................. G11B 21/24
(52) U.S. Cl. .................................................... 360/294.3
(58) Field of Search ........................... 360/294.3, 294.1, 360/294.2, 294.4, 294.5, 294.6

(56) References Cited

U.S. PATENT DOCUMENTS

| | | |
|---|---|---|
| 5,025,346 A | 6/1991 | Tang et al. |
| 5,768,062 A | 6/1998 | Anderson et al. |
| 5,781,381 A | 7/1998 | Koganezawa et al. |
| 5,793,571 A | 8/1998 | Jurgenson et al. |
| 5,867,347 A | 2/1999 | Knight et al. |
| 5,901,010 A | 5/1999 | Glover et al. |
| 5,959,808 A * | 9/1999 | Fan et al. ................. 360/294.3 |
| 6,038,104 A | 3/2000 | Sato et al. |

FOREIGN PATENT DOCUMENTS

| | | |
|---|---|---|
| EP | 0 840 291 A2 | 5/1998 |
| JP | 63 291271 | 11/1988 |
| JP | 3-293955 | 12/1991 |
| JP | 06 038562 | 2/1994 |
| JP | 6-70529 | 3/1994 |
| JP | 07 312880 | 11/1995 |
| JP | 08 180623 | 7/1996 |
| JP | 9-161425 | 6/1997 |
| JP | 09-180382 * | 7/1997 |
| JP | 10-134534 | 5/1998 |
| JP | 11 053854 | 2/1999 |
| JP | 09-180381 * | 7/1999 |
| WO | 99/06993 | 2/1999 |

OTHER PUBLICATIONS

Horsley et al (IEEE, Angular Micropositioner for Disk Drives, pp. 454–459, 1/1997).*
Fan et al (IEEE, Magnetic Recording Head Positioning at Very High Track Densities Using a Microactuator–Based Two–Stage Servo System, pp. 222–233, 6/1995).*
W. Tang et al., "Silicon Micromachined Electromagnetic Microactuators for Rigid Disk Drives", Proceedings of the International Magnetics Conference (Intermag), New York, IEEE, US, Apr. 18, 1995, pp. ED–8.
"Shock–Resistant Rotary Microactuator For Fine Positioning of Recording Heads", IBM Technical Disclosure Bulletin, IBM Corp., New York. US, vol. 37, NR. 8, pp. 401–403.

* cited by examiner

*Primary Examiner*—David Davis
(74) *Attorney, Agent, or Firm*—Burns, Doane, Swecker & Mathis, LLP

(57) ABSTRACT

A head suspension assembly of a hard disk drive includes a rod beam coupled to an end portion of an actuator arm capable of pivoting in a direction following tracks of a disk, a slider supported at an end portion of the rod beam for reading and writing data from and on the disk, a micro actuator including first and second magnetic members installed at the rod beam and the slider, respectively, and being moved by an electromagnetic force between the magnetic members to allow the slider to minutely move with respect to the rod beam, and a connection device for elastically connecting the first magnetic member and the second magnetic member.

10 Claims, 7 Drawing Sheets

DISK DRIVE HEAD SUSPENSION ASSEMBLY WITH MICROACTUATOR

BACKGROUND OF THE INVENTION

1. Field of the Invention

The present invention relates to a head suspension assembly of a disk drive for supporting and moving a head for writing and reading information on and from a recording medium.

2. Description of the Related Art

In general, a disk drive such as a hard disk drive (HDD) includes a head suspension assembly for supporting a head which writes or reads information on and from a track of a disk rotatably installed in a housing.

The head suspension assembly includes a suspension, that is, a rod beam, supported at an end portion of an actuator arm rotated by a voice coil motor (VCM), a Gimbal connected to an end portion of the suspension, and a slider supported at the Gimbal and having the head. The suspension rotated with the actuator arm moves the slider to a desired position across the disk. The head moved while being supported at the slider must be positioned to correspond to a predetermined track of a plurality of tracks provided at the disk where information is to be written or read. The accuracy of the head's tracking is important for the integrity of information being written and read.

It is a recent trend for the size of a disk drive itself to be small while the storage capacity thereof is large. Accordingly, the tracks per inch (TPI) of a disk increases. As the TPI and the rate of rotation of a disk increase, accurate control of the position of the head becomes difficult.

Figure 1:
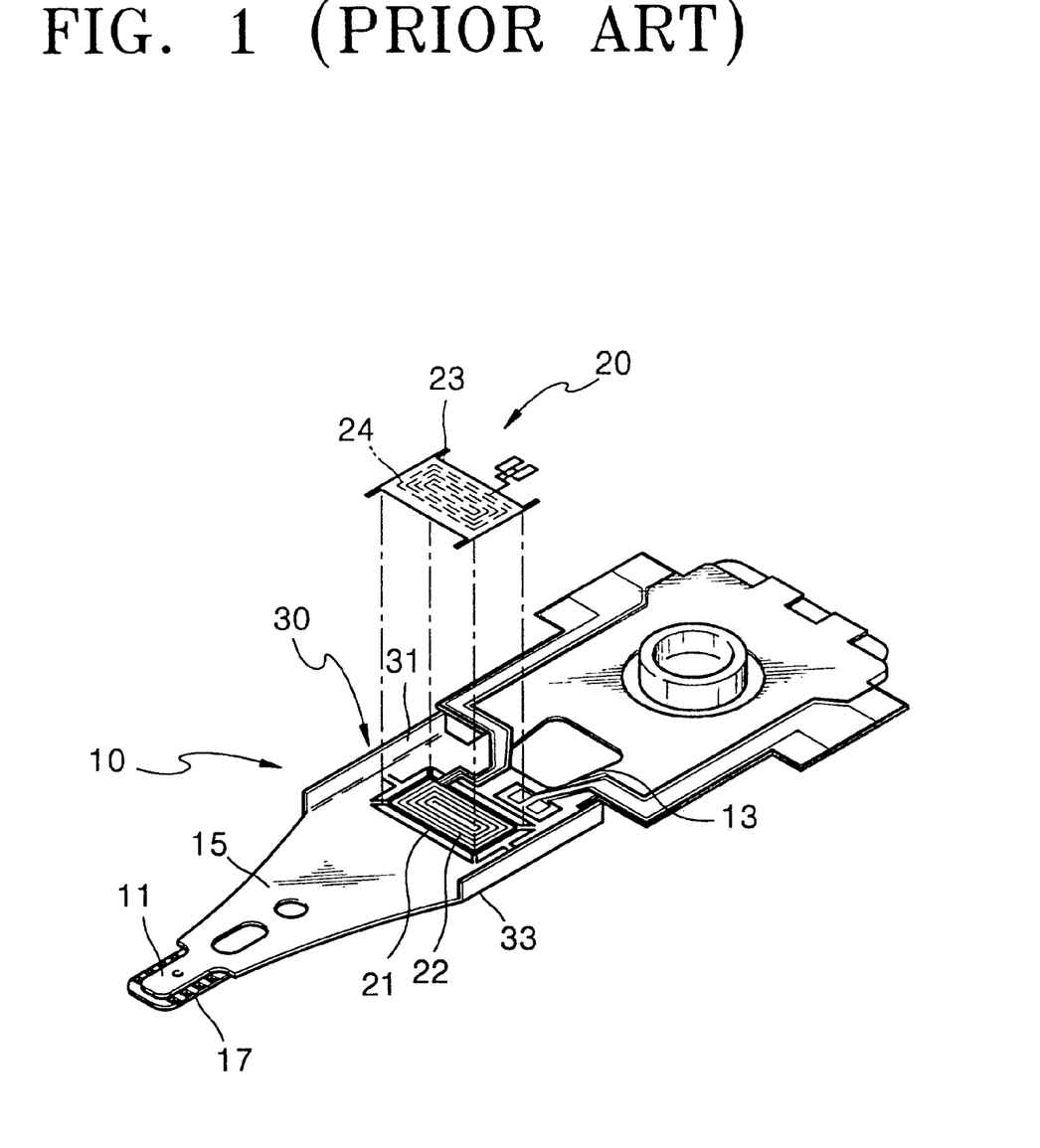
FIG. 1 is a perspective view showing a conventional head suspension assembly of a disk drive.

To solve the above problem, a head suspension assembly having an additional accurate tracking motor or micro actuator is suggested and an example thereof is shown in FIG. 1.

FIG. 1 shows a head suspension assembly disclosed in U.S. Pat. No. 5,857,347. The head suspension assembly includes a rod beam 10 having a horizontal portion 15 formed across an end portion 11 and a middle end portion 13 thereof and supported at an end portion of an actuator arm (not shown). A Gimbal 17 is provided at the end portion 11 of the rod beam 10. A slider (not shown) having a head for reading/writing (not shown) is supported at the Gimbal 17. Also, the end portion 11 and the middle end portion 13 of the rod beam 10 are elastically connected by a connection portion 30. A micro actuator 20 having a first coil unit 21 and a second coil unit 23 is installed around the connection portion 30.

When current is applied to coils 22 and 24 of the first and second coil units 21 and 23, a vertical repulsive force is generated due to an electromagnetic force between the coil units 21 and 23. Then, each of the coil units 21 and 23 is moved up and down by the vertical repulsive force and vertical rail portions 31 and 33 of the connection portion 30 is bent in a horizontal direction. Thus, the end portion 11 pivots in a horizontal direction, that is, in a track direction, with respect to the middle end portion 13 so that the slider is minutely adjusted.

However, such a conventional head suspension assembly requires a large number of parts and the structure of the rod beam is complicated so that a practical application is difficult and production cost is high. Also, a large driving force is needed to drive the rod beam including the slider. However, much power is lost in the process of converting the vertical repulsive force generated between the coil units to a horizontal direction through the connection portion.

SUMMARY OF THE INVENTION

To solve the above problems, it is an objective of the present invention to provide a head suspension assembly of a disk drive having an improved structure in which the slider can pivot with respect to the rod beam.

Accordingly, to achieve the above objective, there is provided a head suspension assembly of a hard disk drive comprising a rod beam coupled to an end portion of an actuator arm capable of pivoting in a direction following tracks of a disk, a slider supported at an end portion of the rod beam for reading and writing data from and on the disk, a micro actuator including first and second magnetic members installed at the rod beam and the slider, respectively, and being moved by an electromagnetic force between the magnetic members to allow the slider to minutely move with respect to the rod beam, and a connection device for elastically connecting the first magnetic member and the second magnetic member.

It is preferred in the present invention that the first magnetic member comprises a first coil base supported at the end portion of the rod beam and a pair of first coils installed at a bottom surface of the first coil base and forming a magnetic field during driving, and the second magnetic member comprises a second coil base installed on an upper surface of the slider to correspond to the first coil base and a second coil installed on an upper surface of the second coil base to correspond to the first coil.

Also, it is preferred in the present invention that the first coils are installed in a circular shape at the left and right sides with respect to a predetermined center line on the slider crossing the track direction and, when current is applied, an induced magnetic field is formed in a vertical direction at a surface of the slider.

Also, it is preferred in the present invention that the second coil is wound in a rectangular shape at an upper surface of the second coil base to generate an electromagnetic force at left and right effective coil portions with respect to a predetermined center line on the slider crossing the track direction.

Also, it is preferred in the present invention that a recessed portion for accommodating the first coil to be separated a predetermined distance from the second coil is formed at the lower surface of the first coil base.

Also, it is preferred in the present invention that the connection device comprises a connection plate having an aperture formed at a bottom surface of the first magnetic member for accommodating the second magnetic member to move therein and an elastic member for elastically connecting an inner surface of the aperture and an outer surface of the second magnetic member.

Also, it is preferred in the present invention that the elastic member comprises hairpin springs symmetrically provided with respect to a predetermined center line on the slider crossing the track direction.

Also, it is preferred in the present invention that the elastic member comprises a torsion bar connected between the inner surface of the aperture and either a front end portion or a rear end portion of the second magnetic member to allow the second magnetic member to pivot with respect to the first magnetic member while being bent by an electromagnetic force between the magnetic members.

Also, it is preferred in the present invention that the connection plate and the elastic member are integrally formed with the second magnetic member.

Also, it is preferred in the present invention that the first magnetic member comprises a magnet base supported at the end portion of the rod beam and having a recessed portion formed at a bottom surface thereof and a pair of magnets installed at the recessed portion of the magnet base such that directions of magnetization are opposite to each other.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 2:
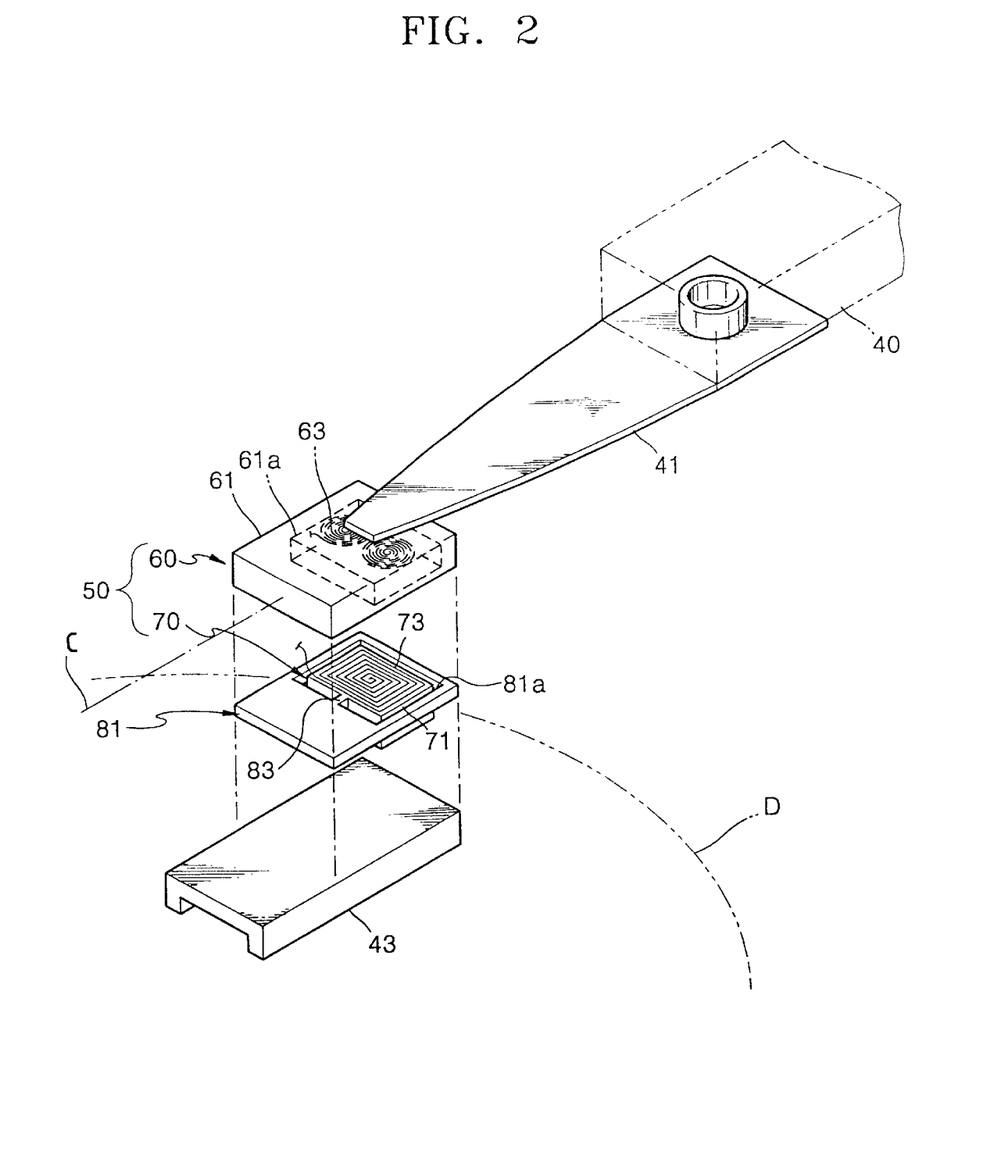
FIG. 2 is an exploded perspective view showing a head suspension assembly of a disk drive according to a preferred embodiment of the present invention.
Figure 3:
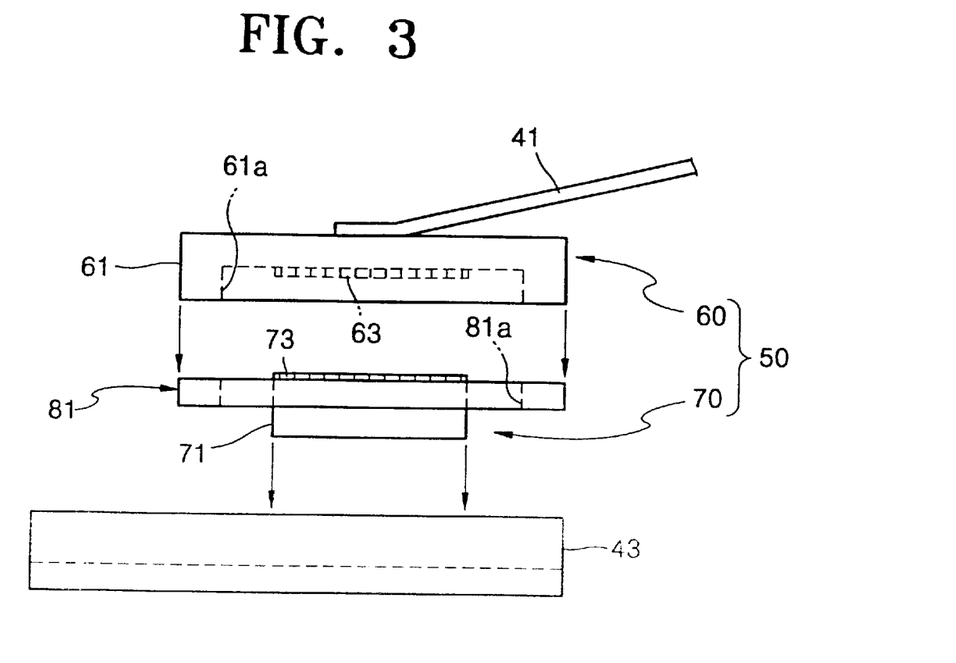
FIG. 3 is a side view of the head suspension assembly shown in FIG. 2.
Figure 4:
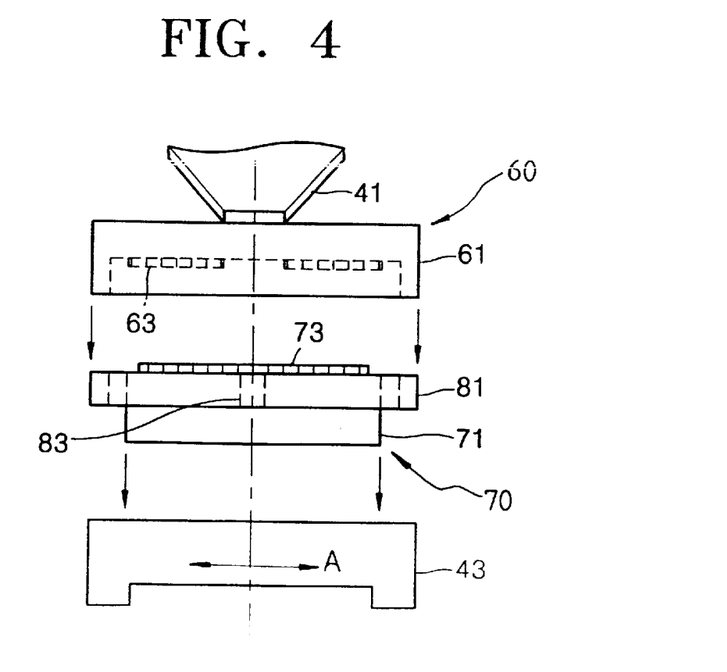
FIG. 4 is a front view of the head suspension assembly shown in FIG. 2.

Referring to FIGS. 2 through 4, a head suspension assembly is for minutely moving a head (not shown) supported thereon for writing/reading information on and from a track of a disk D in a track direction indicated by an arrow A crossing the disk D. The head suspension assembly includes a rod beam 41 coupled to an end portion of an actuator 40, a slider 43 supported at an end portion of the rod beam 41 to move over the disk D while supporting the head, a micro actuator 50 installed between the slider 43 and the rod beam 41, and a connection device.

The micro actuator 50 includes a first magnetic member 60 installed at the end portion of the rod beam 41 and a second magnetic member 70 installed at the slider 43 maintaining a predetermined distance with the first magnetic member 60. The magnetic members 60 and 70 change their postures by an electromagnetic force acting between them when current is applied thereto so that the slider 43 minutely pivots with respect to the rod beam 41.

The first magnetic member 60 includes a first coil base 61 supported at the end portion of the rod beam 41 and a pair of first coils 63 installed on the bottom surface of the first coil base 61. The first coil base 61 has a recessed portion 61a formed at the lower surface thereof with a predetermined depth to receive and support the first coil 63. The first coils 63 each having a circular shape are installed symmetrically to the left and right with respect to a predetermined center line C crossing the slider 53 to the track direction A. When current is applied to the first coils 63, an induced magnetic field is formed in a vertical direction on the surface of the slider 43. The first coil 63 can be installed inside the recessed portion 61a by being coated, plated or wound.

The second magnetic member 70 includes a second coil base 71 installed on the upper surface of the slider 43 to correspond to the first coil base 61, and a second coil 73 installed on the second coil base 71. The second coil 73 is installed in a rectangular shape so that a magnetic force is generated to effective coil portions at both sides with respect to the center line C. The second coil 73 can be installed on the upper surface of the second coil base 71 by being coated, plated or wound.

The connection device includes a connection plate 81 fixed to the bottom surface of the first coil base 61 and an elastic member 83 elastically connecting the connection plate 81 and the second coil base 71. An aperture 81a for accommodating the second coil base 71 to be capable of moving is formed at the connection plate 81. The elastic member 83 connects (the inner surface of) the aperture 81a and (the outer surface of) the second coil base 71. In the present embodiment, the elastic member 83 is preferably a torsion bar elastically connecting (the front end portion of) the second coil base 71 and (the inner surface on the aperture 81a. Also, the elastic member 83 is formed integrally with the second coil base 71. The elastic member 83 is elastically deformed by an external force so that the second coil base 71 minutely pivots with respect to the first coil base 61 with respect to the center line C.

Figure 5:
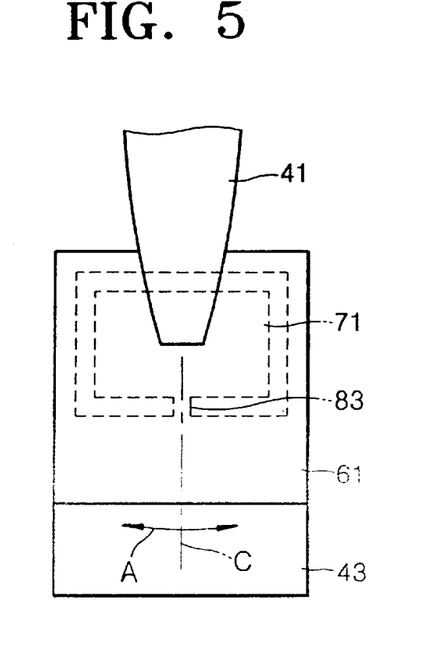
FIGS. 5 and 6 are plan views for explaining the operation of the head suspension assembly of a disk drive according to the preferred embodiment of the present invention.
Figure 6:
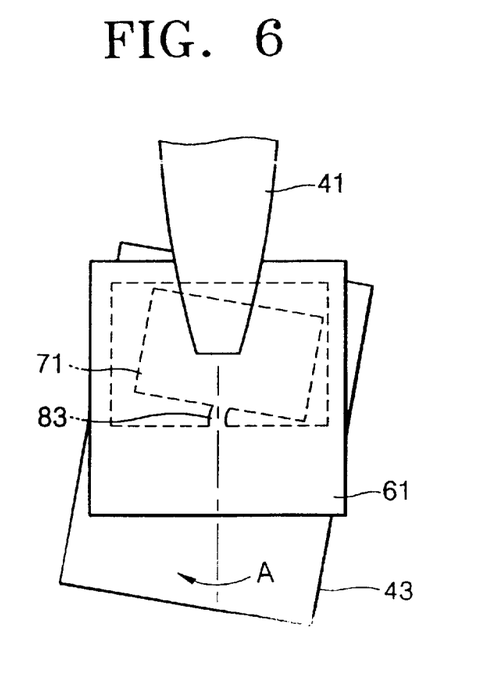

The operation of the head suspension assembly of a disk drive according to a preferred embodiment of the present invention is described with reference to FIGS. 2, 5 and 6.

When current is applied in different directions to each of the first coils 63, an induced magnetic field is formed in a vertical direction on the surface of the slider 43. When current is applied to the second coil 73 in a state in which the induced magnetic field is formed by the first coil 63, a magnetic force according to Fleming's left hand rule is generated at effective coil portions at both sides of the second coil 73 with respect to the center line C. By the generated magnetic force, the second coil base 71 is minutely moved in any one direction with respect to the center line C while elastically deforming the elastic member 83. Thus, the slider 43 connected to the second coil base 71 can minutely pivot in the track direction A of the disk D. That is, while the first coil base 61 is fixed to the rod beam 41 and the connection plate 81 is attached to the first coil base 61, the slider 43 pivots with the first coil base 71 by the magnetic force.

As described above, as the slider 43 pivots using the magnetic force according to Fleming's left hand rule, the direction of the force need not be changed. Therefore, much power can be generated compared to the conventional technology. Also, as the structure of the assembly is simple, actual manufacture and embodiment thereof by a microelectromechanical system (MEMS) manufacturing technology is made easy.

Figure 7:
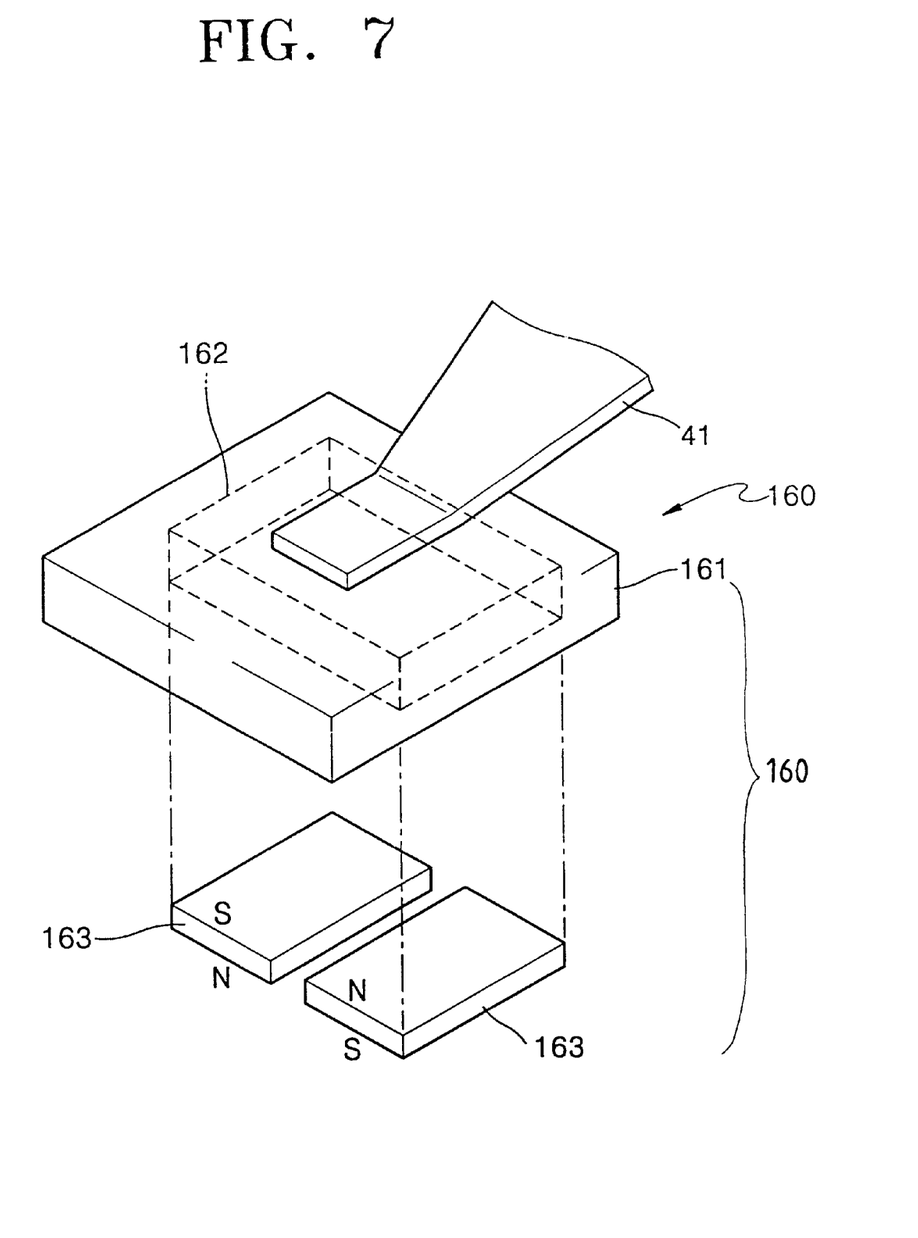
FIG. 7 is a perspective view showing major portions of a head suspension assembly of a disk drive according to another preferred embodiment of the present invention.

As shown in FIG. 7, as an alternative to the first magnetic member 60, a first magnetic member 160 is provided which includes a magnet base 161 installed at the end portion of the rod beam 41 and a pair of magnets 163. At the lower surface of the magnet base 161, a recessed portion 162 for accommodating the magnets 163 is formed. The magnets 163 each have S and N poles at the upper and lower sides thereof, respectively, and are installed such that directions of magnetization are opposite to each other. The first magnetic member 160 having the above structure constitutes a micro actuator which can make the slider 43 pivot minutely, together with the second magnetic member 70 of FIG. 2.

Figure 8:
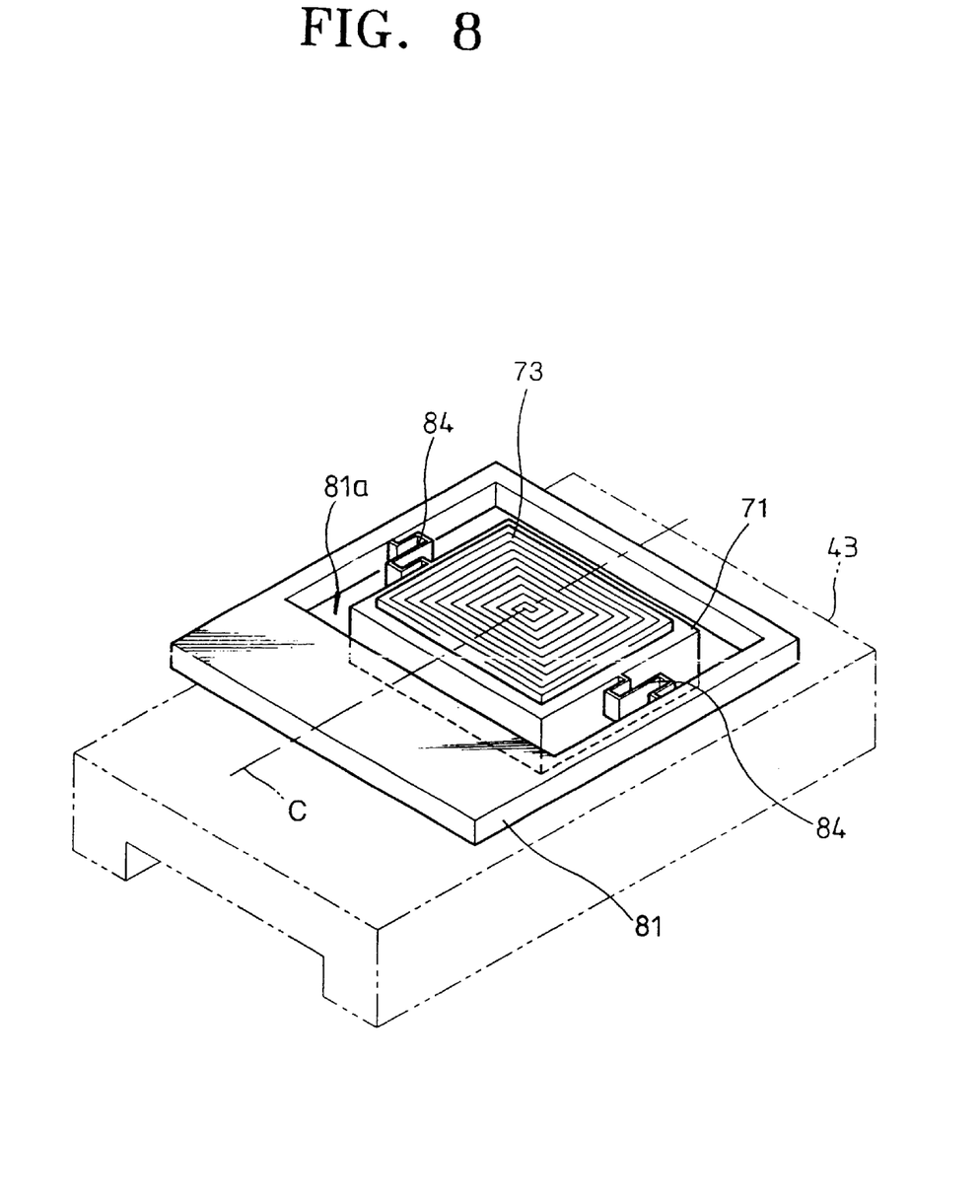
FIG. 8 is a perspective view showing major portions of a head suspension assembly of a disk drive according to yet another preferred embodiment of the present invention.
Figure 9:
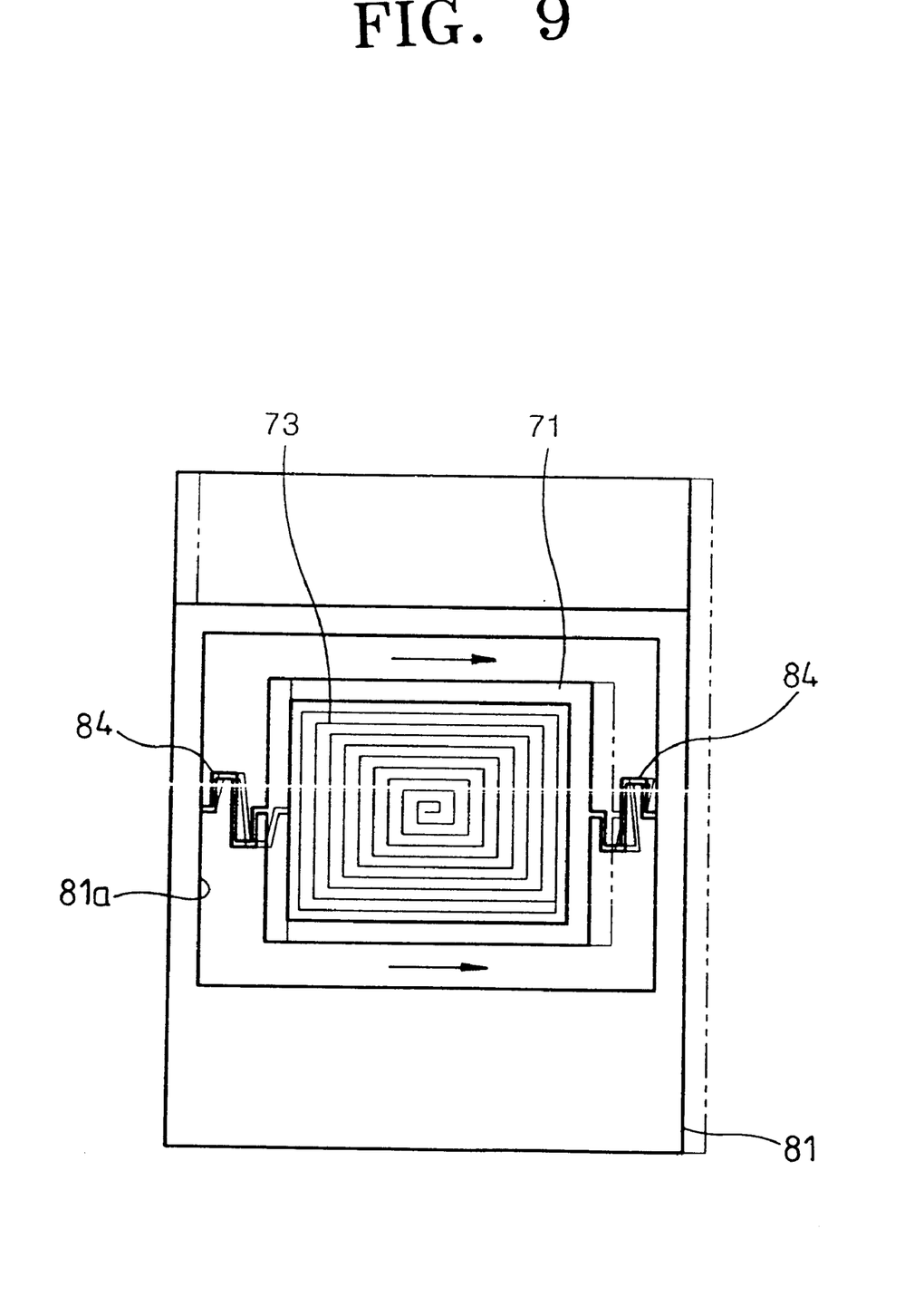
FIG. 9 is a plan view for explaining the operation of the head suspension assembly shown in FIG. 8.

Also, as another example of the connection device, as shown in FIG. 8, a pair of elastic members 84 elastically connecting (the inner surface of) the aperture 81a of the connection plate 81 and (the outer surface of) the second coil base 71 are provided. The elastic members 84 connect the left and right surfaces of the second coil base 71 symmetrically with respect to the center line C. Also, the elastic members 84 are preferably hairpin springs bent several times into a predetermined shape. Thus, as shown by an imaginary line in FIG. 9, when the second coil base 71 is moved by a magnetic force, one of the elastic members 84 is compressed while the other is extended, so that the slider 43 is supported to be capable of moving minutely. Also, although not shown, the elastic members 84 may be installed on the center line C so that they can be extended simultaneously when the slider 43 is moved. That is, the elastic members 84 can be connected to the front and rear end portions of the second coil base 71, respectively.

As described above, the head suspension assembly of a disk drive according to the present invention has a simple structure, and thus, it can easily be manufactured to be small. Also, as more power can be obtained compared to the conventional technology, electric power consumption is less and the slider can be controlled minutely.

In the meantime, the head suspension assembly of a disk drive according to the present invention which can be accurately driven with a simple structure can be adopted to most existing hard disk drive (HDD) apparatuses and near field recording drives (NFRDs) currently and widely studied with combination of an optical technology such as an optical head. Thus, the present invention can be useful for accurate control of an optical head having a high surface density compared to conventional HDDs. Also, the present invention can be used for laser scanners or printers to minutely control driving mirrors which are optical devices.

What is claimed is:

1. A head suspension assembly of a hard disk drive comprising:
   a rod beam coupled to an end portion of an actuator arm capable of pivoting in a direction following tracks of a disk;
   a slider supported at an end portion of the rod beam for reading and writing data from and on the disk;
   a micro actuator including first and second magnetic members installed at the rod beam and the slider, respectively, and being moved by an electromagnetic force between the magnetic members to allow the slider to minutely move with respect to the rod beam; and
   a connection device for elastically connecting the first magnetic member and the second magnetic member,
   wherein the first magnetic member comprises a first coil base supported at the end portion of the rod beam and a pair of first coils installed at a bottom surface of the first coil base and forming a magnetic field during driving, and the second magnetic member comprises a second coil base installed on an upper surface of the slider to correspond to the first coil base and a second coil installed on an upper surface of the second coil base to correspond to the first coil.

2. The head suspension assembly as claimed in claim 1, wherein the first coils are installed in a circular shape at the left and right sides with respect to a predetermined center line on the slider crossing the track direction and, when current is applied, an induced magnetic field is formed in a vertical direction at a surface of the slider.

3. The head suspension assembly as claimed in claim 1, wherein the second coil is wound in a rectangular shape at an upper surface of the second coil base to generate an electromagnetic force at left and right effective coil portions with respect to a predetermined center line on the slider crossing the track direction.

4. The head suspension assembly as claimed in claim 1, wherein a recessed portion for accommodating the first coil to be separated a predetermined distance from the second coil is formed at the lower surface of the first coil base.

5. A head suspension assembly of a hard disk drive comprising:
   a rod beam coupled to an end portion of an actuator arm capable of pivoting in a direction following tracks of a disk;
   a slider supported at an end portion of the rod beam for reading and writing data from and on the disk;
   a micro actuator including first and second magnetic members installed at the rod beam and the slider, respectively, and being moved by an electromagnetic force between the magnetic members to allow the slider to minutely move with respect to the rod beam; and
   a connection device for elastically connecting the first magnetic member and the second magnetic member, wherein the connection device comprises:
      a connection plate having an aperture formed at a bottom surface of the first magnetic member for accommodating the second magnetic member to move therein; and
      an elastic member for elastically connecting an inner surface of the aperture and an outer surface of the second magnetic member.

6. The head suspension assembly as claimed in claim 5, wherein the elastic member comprises hairpin springs symmetrically provided with respect to a predetermined center line on the slider crossing the track direction.

7. The head suspension assembly as claimed in claim 5, wherein the elastic member comprises a torsion bar connected between the inner surface of the aperture and either a front end portion or a rear end portion of the second magnetic member to allow the second magnetic member to pivot with respect to the first magnetic member while being bent by an electromagnetic force between the magnetic members.

8. The head suspension assembly as claimed in claim 5, wherein the connection plate and the elastic member are integrally formed with the second magnetic member.

9. A head suspension assembly of a hard disk drive comprising:
   a rod beam coupled to an end portion of an actuator arm capable of pivoting in a direction following tracks of a disk;
   a slider supported at an end portion of the rod beam for reading and writing data from and on the disk;
   a micro actuator including first and second magnetic members installed at the rod beam and the slider, respectively, and being moved by an electromagnetic force between the magnetic members to allow the slider to minutely move with respect to the rod beam; and
   a connection device for elastically connecting the first magnetic member and the second magnetic member,
   wherein the first magnetic member comprises:
      a magnet base supported at the end portion of the rod beam; and
      a pair of magnets installed on the magnet base such that directions of magnetization are opposite to each other.

10. The head suspension assembly as claimed in claim 9, wherein said magnetic base has a recessed portion formed at a bottom surface thereof.

* * * * *